(12) United States Patent
Norgia et al.

(10) Patent No.: US 11,435,281 B2
(45) Date of Patent: Sep. 6, 2022

(54) METHOD AND APPARATUS FOR MEASURING THE PROPERTIES OF A LIQUID

(71) Applicant: F-LAB S.R.L., Corsico (IT)

(72) Inventors: Michele Norgia, Milan (IT); Diego Andreis, Milan (IT); Fabrizio Tessicini, Imola (IT)

(73) Assignee: F-LAB S.R.L., Corsico (IT)

( * ) Notice: Subject to any disclaimer, the term of this patent is extended or adjusted under 35 U.S.C. 154(b) by 796 days.

(21) Appl. No.: 16/362,996

(22) Filed: Mar. 25, 2019

(65) Prior Publication Data

US 2019/0293543 A1     Sep. 26, 2019

(30) Foreign Application Priority Data

Mar. 26, 2018    (IT) ........................ 102018000003956

(51) Int. Cl.

| | | |
|---|---|---|
| *G01N 15/14* | (2006.01) | |
| *G01F 1/661* | (2022.01) | |
| *G01N 15/02* | (2006.01) | |
| *G01N 15/06* | (2006.01) | |
| *G01N 21/85* | (2006.01) | |
| *G01B 9/02* | (2022.01) | |

(Continued)

(52) U.S. Cl.
CPC ..... *G01N 15/1434* (2013.01); *G01B 9/02092* (2013.01); *G01F 1/661* (2013.01); *G01N 15/0211* (2013.01); *G01N 15/06* (2013.01); *G01N 15/1456* (2013.01); *G01N 21/85* (2013.01); *G01N 2015/0277* (2013.01); *G01N 2015/0693* (2013.01); *G01N 2015/1075* (2013.01); *G01N 2015/1454* (2013.01); *G01N 2015/1486* (2013.01); *G01N 2021/8405* (2013.01); *G01S 7/4916* (2013.01)

(58) Field of Classification Search
CPC .......... G01N 15/1434; G01N 15/0211; G01N 15/06; G01N 15/1456; G01N 21/85; G01N 2015/0277; G01N 2015/0693; G01N 2015/1075; G01N 2015/1454; G01N 2015/1486; G01N 2021/8405; G01F 1/661; G01B 9/02092; G01S 7/4916

See application file for complete search history.

(56) References Cited

FOREIGN PATENT DOCUMENTS

| CN | 102564909 B | 5/2014 |
|---|---|---|
| EP | 2455733 A1 | 5/2012 |

(Continued)

OTHER PUBLICATIONS

Ohtomo et al. "Detection and counting of a submicrometer particle in liquid flow by self-mixing microchip Yb:YAG laser velocimetry" (Year: 2016).*

(Continued)

*Primary Examiner* — Benjamin R Schmitt
(74) *Attorney, Agent, or Firm* — Cantor Colburn LLP

(57) ABSTRACT

A method and an apparatus for measuring the properties of a liquid that exploit the power modulation a laser light beam undergoes due to the retro-reflection of the laser light beam itself towards the laser cavity from which the laser is generated when this laser light is directed towards a transparent conduit through which the liquid for which the properties are to be measured flows, where this power modulation is detected by at least one photodiode arranged downstream of the transparent conduit.

14 Claims, 2 Drawing Sheets

(51) Int. Cl.
    *G01N 21/84*    (2006.01)
    *G01S 7/4912*   (2020.01)
    *G01N 15/10*    (2006.01)

(56) References Cited

FOREIGN PATENT DOCUMENTS

EP    3054280 A1    8/2016
WO    2010106479 A1   9/2010

OTHER PUBLICATIONS

Masiyano et al. "Self-mixing interference effects in tunable diode laser absorption spectroscopy" (Year: 2009).*

Alexandrova Alexandra, et al, "Laser Diode self-Mixing Interfermetry for Velocity Measurements", Optical Engineering SOC, vol. 54, No. 3, Mar. 2015, p. 34104, XP060053972.

Masiyano D. et al., "Self-mixing interference effects in tunable diode laser absorption spectroscopy", Applied Physics B, vol. 96., No. 4, Aug. 6, 2009, pp. 863-874, XP019739165.

Sudo, et al. "Detection of Small Particles in Fluid Flow Using a Self Mixing Laser" Optics Express, vol. 15, No. 13, Jun. 25, 2007, XP002605085.

* cited by examiner

METHOD AND APPARATUS FOR MEASURING THE PROPERTIES OF A LIQUID

The present invention relates to a method and an apparatus for measuring the properties of a fluid and in particular of a fluid that flows through a conduit. The properties of the fluid that the method and apparatus according to the invention make it possible to measure are for example the speed and the flow rate of the fluid inside the conduit, the presence of suspended particles in the fluid, as well as the number, type and size of the same.

It is currently known the use of optical flow sensors based on the reading of the small disturbance that a laser diode undergoes when a portion of the power emitted by the same is retro-reflected in the laser cavity from which the laser light beam is generated in order to measure the flowing speed of a fluid. This effect is known as "self-mixing interferometry".

The effect of self-mixing is normally undesirable in optical measurement instrumentation, as it induces a modulation of the laser source induced by retro-reflections, which is often a disturbance for the measurement technique itself. For example, in optical spectroscopy measurements certain methods are proposed for cancelling the self-mixing effect, based on several photodetectors, when it is not possible to use an optical isolator. According to the state of the art, the optical sensors that use the principle of self-mixing interferometry comprise a semiconductor laser source, or a laser diode, provided with a photodiode, called a monitor photodiode. This laser source has a laser cavity from which a laser beam is generated. This laser beam hits a transparent conduit where the fluid to be measured flows. The direction of the laser beam that hits the transparent conduit has an angle relative to the flow direction of the fluid. The measurement of the flowing speed of the fluid along the conduit is based on the Doppler shift caused by the diffusion ("scattering") due to the presence of moving particles inside the fluid.

In fact, the laser beam which has undergone the Doppler effect and is retro-reflected towards the laser cavity modulates the frequency and the amplitude of the laser beam itself coming out of the laser cavity. The measurement, through the monitor photodiode placed at the laser cavity itself, of the modulation of the amplitude of the laser beam makes it possible to obtain the speed, and therefore the flow rate, of the fluid flowing in the transparent conduit.

Basically the monitor photodiode makes it possible to measure the so-called self-mix signal of the laser beam.

Alternatively, for the purposes of generating the aforementioned Doppler shift of the laser beam, it is known to exploit the natural divergence of the laser light beams. In this case the laser beam which is retro-reflected contains the sum of the Doppler shift contributions weighted with respect to the angles of divergence of the laser beam itself.

However, the known type of optical measurement systems described above are not free from drawbacks, including the fact that they have a low sensitivity and that such sensitivity is however strongly influenced by the chemical/physical characteristics of the fluid in question.

These measurement systems are in fact applicable only in the case of fluids which, when hit by a laser light beam, produce a high level of scattering. In fact, the signal-to-noise ratio of the measurement systems that adopt the principle of self-mixing interferometry is strongly dependent on the scattering level of the particles present in the fluid.

The aim of the present invention is to provide a method and an apparatus for measuring the properties of a fluid that solve the technical problem described above, making it possible to improve the sensitivity of the measurement, emphasizing the self-mixing effect in order to improve the modulation signal induced for measuring the flow and characteristics of fluids. Within the scope of this task, an object of the present invention is to provide a method and an apparatus for measuring the properties of a fluid whose measurement sensitivity does not depend on the chemical/physical properties of the fluid itself.

Another object of the invention is to provide a method and an apparatus which make it possible to measure a plurality of fluids having different chemical/physical properties.

Another object of the invention is to provide a measurement method and apparatus whose performance is not affected by the temperature variations of the fluid or the size and geometric characteristics of the conduit through which the fluid to be measured flows.

Another object of the present invention is to provide a method and an apparatus which are particularly simple and functional and which have contained implementation, production and use costs.

The task set forth above, as well as the mentioned objects and others which will become more apparent hereinafter, are achieved by a method for measuring the properties of a liquid as set forth in claim 1.

The task set forth above, as well as the mentioned objects and others which will become more apparent hereinafter, are also achieved by an apparatus for measuring the properties of a liquid as set forth in claim 9.

Other characteristics are envisaged in the dependent claims.

Additional characteristics and advantages will become more apparent from the description of two preferred but not exclusive embodiments of an apparatus for measuring the properties of a liquid, illustrated by way of non-limiting example with the aid of the appended drawings, in which.

Figure 1:
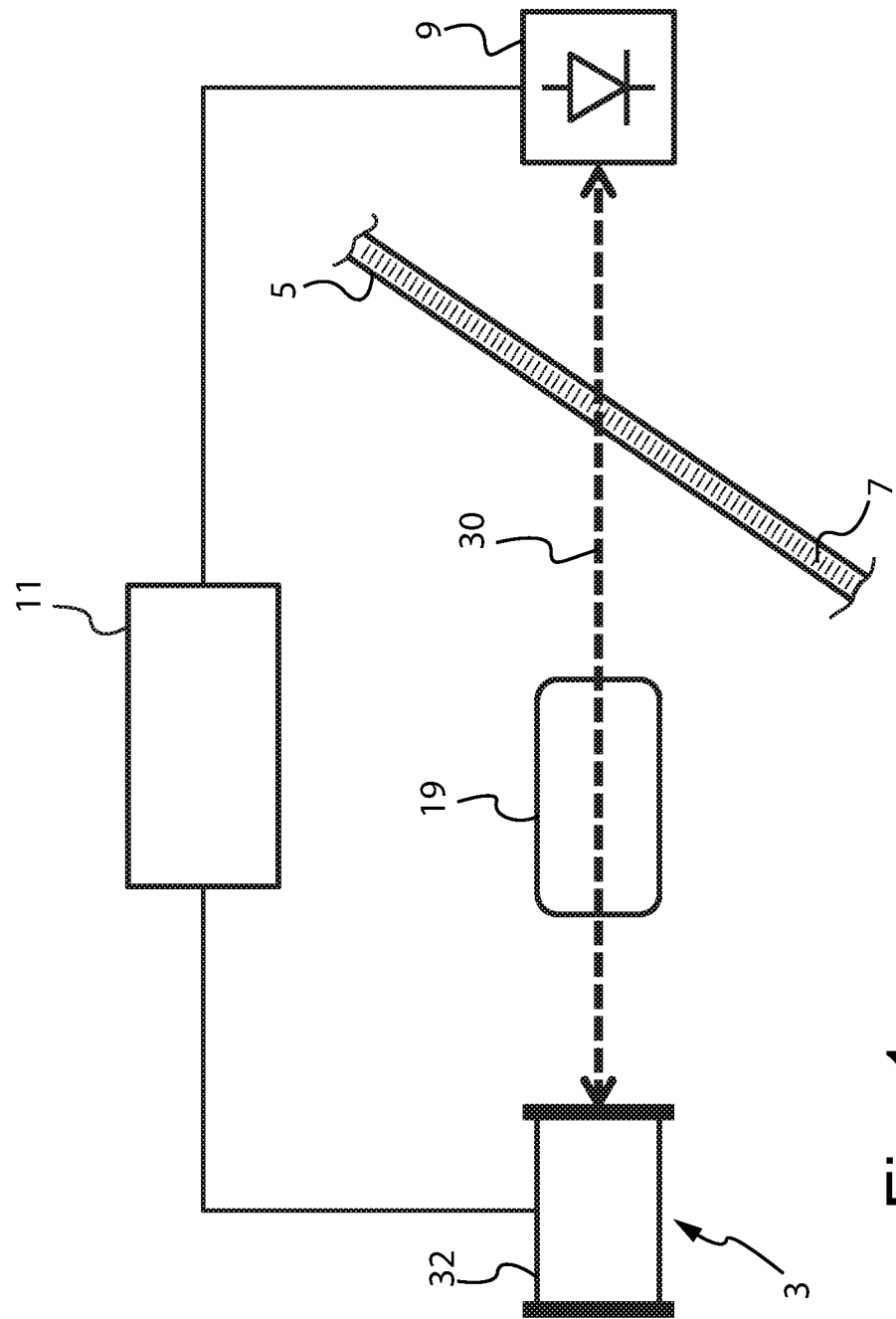
FIG. 1 is a schematic view of a first embodiment of an apparatus for measuring the properties of a liquid according to the invention.

With reference to the aforementioned figures, the apparatus for measuring the properties of a liquid, generally designated by the reference number 1, comprises a semiconductor laser source 3 comprising a laser cavity 32. The laser source 3 is adapted to generate a laser light beam 30 directed towards a conduit 5, transparent to the laser light beam 30, through which a liquid 7 whose properties are to be measured flows. Inside the transparent conduit 5 the power of the laser light beam 30 is modulated due to the retro-reflection of the laser light beam 30 towards the laser cavity 32 caused by the suspended particles moving inside the liquid 7. This phenomenon is known as self-mixing interferometry.

According to the invention, the apparatus 1 comprises a first photodiode 9, arranged downstream of the transparent conduit 5, adapted to detect the power of the laser light beam 30 modulated due to said retro-reflection and a processing and control unit 11 adapted to process said detected modulated power to obtain one or more of the following properties of the liquid 7:

average flowing speed of the liquid 7 in the conduit 5,
flow rate of the liquid 7 in the conduit 5;
presence of suspended particles in the liquid 7,
average size of the suspended particles in the liquid 7,
average number of suspended particles in a determined volume of the liquid 7, type of suspended particles in the liquid 7.

The apparatus 1 is illustrated schematically in its simplest embodiment in FIG. 1.

The present invention also relates to a method for measuring the properties of a liquid comprising the steps of:

generating a laser light beam 30 from a semiconductor laser source 3 comprising a laser cavity 32;

directing this laser light beam 30 towards a conduit 5 transparent to said laser light beam 30 through which a liquid 7 flows, inside said transparent conduit 5 the power of the laser light beam 30 is modulated due to retro-reflection of said laser light beam 30 towards the laser cavity 32 caused by suspended particles moving inside the liquid 7.

According to the invention, the method for measuring the properties of a liquid comprises the steps of:

detecting, through a first photodiode 9 arranged downstream of the transparent conduit 5, the power of the laser light beam 30 modulated due to said retro-reflection;

processing the detected modulated power, through a processing and control unit 11, in order to obtain one or more of the following properties of the liquid 7:

average flowing speed of the liquid 7 in the conduit 5,
flow rate of the liquid 7 in the conduit 5;
presence of suspended particles in the liquid 7,
average size of the suspended particles in the liquid 7,
average number of suspended particles in a determined volume of the liquid 7,
type of suspended particles in the liquid 7.

The term particles also refers to agglomerates, such as micellar agglomerates for example.

Substantially the first photodiode 9 is adapted to detect the so-called self-mix signal downstream of the conduit 5, unlike to what occurs in the case of self-mixing interferometry as described with reference to the prior art, according to which the self-mix signal is detected with a monitor photodiode arranged upstream of the laser cavity.

In the case of a substantially transparent liquid, this first photodiode 9 is normally able to collect power of 1 or 2 more orders of magnitude than a monitor photodiode placed on the back of the laser. For example, in the case of "Fabry-Perot" laser diodes of the type used to write CD-DVDs, and operating in the near-infrared, the first photodiode 9 is able to detect a 20 mW power signal against the 0.2 mW detectable by a monitor photodiode according to the prior art. Given that optical noise, so-called "shot-noise", grows with the square root with respect to the signal, having 100 times more power corresponds to a 20 dB improvement in the signal-to-noise ratio. This improvement also allows the very low back-diffused light in barely diffusive liquids such as tap water or water-based solutions such as syrups to be seen, considerably extending the fields of use of the apparatus 1, according to the invention. Furthermore, low-cost laser diodes without a monitor photodiode can be used for the semiconductor laser source 3.

Figure 2:
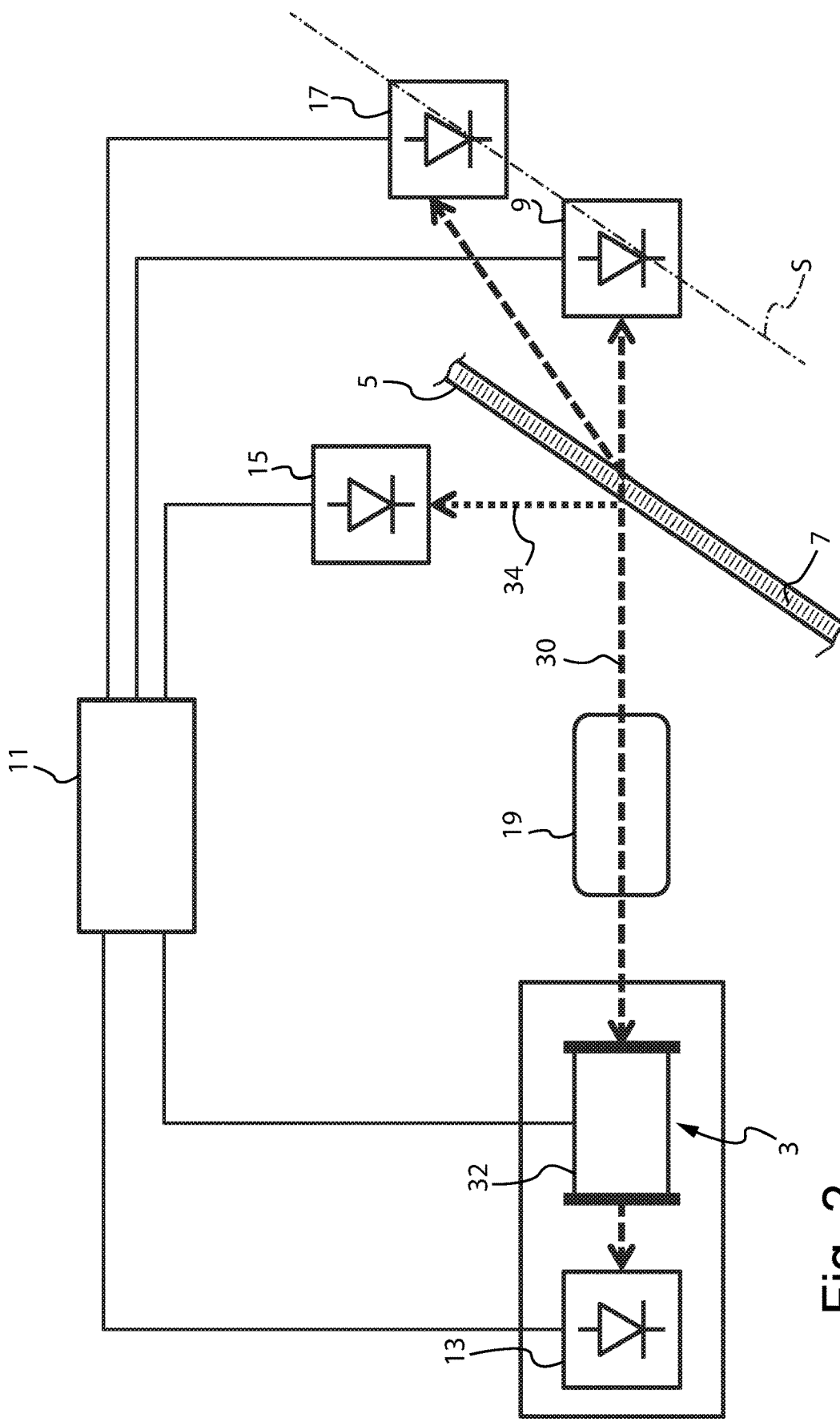
FIG. 2 is a schematic view of a second embodiment of an apparatus for measuring the properties of a liquid according to the invention.

Advantageously, as shown in FIG. 2, the apparatus 1 comprises a second photodiode 13 arranged upstream of the laser cavity 32, adapted to detect the power of the laser light beam 30 modulated due to the retro-reflection. In this case the processing and control unit 11 is adapted to also process the modulated power detected by the second photodiode 13 to obtain one or more of the properties listed above of the liquid 7.

Correspondingly, the method for measuring the properties of a liquid advantageously comprises the steps of:

detecting, through the second photodiode 13 arranged upstream of the laser cavity 32, the power of the laser light beam 30 modulated due to said retro-reflection;

processing the modulated power detected by the second photodiode 13, through the processing and control unit 11, in order to obtain one or more of the properties of the liquid 7 listed above.

Preferably the method comprises the step of correlating the modulated power detected by the first photodiode 9 with the modulated power detected by the second photodiode 13 to improve the signal-to-noise ratio of the power modulation signal of the laser light beam 30 which is detected by the two photodiodes 9 and 13.

The first photodiode 9, later also called "external photodiode", and the second photodiode 13, later also called "internal photodiode" or "monitor photodiode", both measure the amplitude modulations of the laser light beam 30 induced by the self-mixing effect. However, these modulations have opposite signs between them. By calculating the difference between the two self-mix signals detected by the two photodiodes 9 and 13, a gain factor of 2 is obtained on the amplitude of the self-mix signal, and furthermore a subtraction of all common disturbances, such as noise and disturbances from the power supply of the laser source 3, as well as the "shot-noise" and the "1/f" noise of the laser itself, is obtained.

In this way the apparatus 1 is able to obtain the properties of a high variety of different liquids 7. For example, in the case of transparent liquids 7 and therefore poorly diffusive, the power measured by the external photodiode 9 is much greater than that measured by the monitor photodiode 13, and in this case therefore the information obtained from the external photodiode 9 can be sufficient to obtain the properties of interest of the liquid 7. On the other hand, in the case of highly diffusive liquids 7, such as milk, blood or even liquids specially made with microspheres designed to increase the scattering coefficient, the information obtained by the monitor photodiode 13 becomes more relevant. In the case wherein the values of the powers detected respectively by the external photodiode 9 and by the monitor photodiode 13 are substantially comparable, as described above, the advantage of being able to subtract the self-mix signals with opposite signs and a comparable absolute value is further accentuated.

Advantageously the apparatus 1 for measuring the properties of a liquid comprises a third photodiode 15 arranged substantially orthogonally with respect to the direction of the laser light beam 30, adapted to detect the power of the radiation scattered 34 by the suspended particles moving within the liquid 7. The processing and control unit 11 is able to process the power of the scattered radiation 34 detected by the third photodiode 15 to obtain the statistical distribution of the suspended particles in the liquid 7, and in particular of the small diffusive particles, i.e. the particles with diameters less than 10 μm and to provide verification or redundancy information with respect to the other obtained properties of the liquid 7.

Correspondingly, the method for measuring the properties of a liquid advantageously comprises the steps of:

detecting, through the third photodiode 15 arranged substantially orthogonally relative to the direction of the laser light beam 30, the power of the radiation scattered 34 by the suspended particles moving inside the liquid 7;

processing the power of the scattered radiation 34 detected by the third photodiode 15 through the processing and control unit 11, to obtain the statistical distribution of the suspended particles in the liquid 7, and in particular of the smaller diffusive particles, (i.e., particles with diameters less than 10 μm) and to provide verification or redundancy information with respect to the other obtained properties of the liquid 7.

The apparatus 1 advantageously comprises a fourth photodiode 17 arranged in series to said first photodiode 9, i.e. placed alongside said first photodiode 9 along a direction S substantially parallel to the flow direction of the liquid 7 inside the conduit 5, adapted to detect the power of the laser light beam 30 modulated by the presence of the liquid 7.

Advantageously, the processing and control unit 11 is adapted to correlate the modulated power detected by the first photodiode 9 with the modulated power detected by the fourth photodiode 17 to estimate the refractive index of the liquid 7 and obtain the Brix degrees of the liquid 7.

The estimation of the Brix degrees of a liquid can in fact be carried out through a measurement of the refractive index. The addition of a fourth photodiode 17, together with the first photodiode 9, allows a measurement of the refraction angle of the laser beam 30, which varies with said index.

Correspondingly, the method for measuring the properties of a liquid advantageously comprises the steps of:

detecting, through a fourth photodiode 17 arranged in series to the first photodiode 9, the power of the laser light beam 30 modulated due to the presence of the liquid 7;

correlating the modulated power detected by the first photodiode 9 with the modulated power detected by the fourth photodiode 17 to estimate the refractive index of the liquid 7;

obtaining the Brix degrees of the liquid 7.

In fact, by evaluating the ratio between the powers detected by the first photodiode 9 and the fourth photodiode 17, it is possible to estimate the refractive index of the liquid 7 and thus obtain the Brix degrees of the liquid 7.

In particular the ratio between the powers detected by the first photodiode 9 and the fourth photodiode 17 varies as a function of the refractive index of the liquid 7, the refraction index varying as a function of the Brix degrees of the liquid 7.

Advantageously, the method for measuring the properties of a liquid also comprises the steps of:

detecting, by means of at least a fourth photodiode 17 arranged in series to the first photodiode 9, i.e. placed alongside the first photodiode 9 along a direction S substantially parallel to the flow direction of the liquid 7 inside the conduit 5, the power of said laser light beam 30 modulated due to the presence of particles in the liquid 7;

cross-correlating over time the modulated power detected by the first photodiode 9 with the modulated power detected by the fourth photodiode 17 to estimate the flowing speed of the liquid 7;

obtaining the flow of the liquid 7 in the conduit 5.

Essentially, given the distance between the two photodiodes 9 and 17 arranged in series along the direction S, the cross-correlation over time of the signals detected by the two photodiodes 9 and 17 allows the same event (e.g. a passage of particles) to be identified over time to then trace back to the speed of the liquid 7 inside the conduit 5.

Advantageously, the cross-correlation over time of the signals detected by the two photodiodes 9 and 17 in series can make it possible to obtain even more properties of the liquid 7 with greater accuracy, such as for example the presence, quantity and size of particles present in the liquid 7 or of suspended bubbles.

Advantageously, a plurality of further photodiodes can also be present, in series to the photodiodes 9 and 17.

Advantageously, the method for measuring the properties of a liquid also comprises the step of analysing over time the modulated power detected by the first photodiode 9 to identify and count particles or air bubbles with diameters greater than 10 μm inside the liquid 7, thanks to the shadow generated by the passage of such bubbles or large particles.

Advantageously, the laser light beam 30 generated by the semiconductor laser source 3 exhibits a natural divergence. This natural divergence is preferably greater than 5°, but can also be greater than 30°. This natural divergence is sufficient to ensure that the Doppler effect necessary for the generation of the self-mix signal occurs, without the need to also use a collimation lens, as described below.

As an alternative to exploiting only the natural divergence of the laser light beam 30, the apparatus 1 can comprise a collimation lens 19 of the laser light beam 30. In this case a collimating step of the laser light beam 30 through this collimation lens 19 is advantageously also provided.

Advantageously for the measurement of the flowing speed of the liquid 7, the spectrum of the self-mix signal is analysed, and preferably the spectrum of the difference between the self-mix signals as detected by the external photodiode 9 and by the monitor photodiode 13. To measure the other physical properties of the liquid 7, the amplitude and the shape of the self-mix spectrum are analysed.

Starting from the self-mix signal spectrum, it is in fact possible to obtain the flowing speed of the liquid 7 being measured through a frequency analysis, dictated by the physical phenomenon of the Doppler shift of the back-scattered radiation towards the laser. Depending on the optical characteristics of the liquid, such as the diffusion and absorption coefficients, and the optical configuration adopted, such as the presence or absence of a lens for collimation or focus of the laser light beam 30, the spectrum of the signal detected by the photodiodes 9 and 13 will show a different trend. Based on this trend, it is possible to optimise the algorithm for extracting information on the liquid such as flowing speed, transparency of the liquid, diffusion coefficient.

For example, considering a laser light beam without optics, the spectrum of the measurement signal shows an exponential trend descending in frequency. In this case the algorithm offering the best accuracy consists in calculating the barycentre in the spectrum frequency (a sort of average frequency of the scattering) which is proportional to the average speed of the liquid 7 in the conduit 5.

On the other hand, in the case wherein an optic 19 is provided which produces a focus inside the conduit 5, where a liquid 7 with a low attenuation coefficient flows, a spectrum with a strong peak at the Doppler frequency can be observed, dictated by the speed of the liquid 7 in the focus position. In this case the most efficient algorithm lies in estimating the Doppler frequency through a threshold measurement of the maximum frequency present in the spectrum.

In the case wherein the liquid 7 exhibits a strong optical attenuation, the spectra generated by the self-mix effect still exhibit an exponentially decreasing shape, for which it is advisable to perform a barycentre processing as briefly described above.

To improve the reliability of the processing it is possible to perform the barycentre processing on a logarithmic scale, after subtracting the background noise.

These signal processing techniques can be combined with other known signal processing techniques, such as for example regression techniques, weighted averages, search for maxima in the signal, as well as machine-learning techniques.

Once the speed of the liquid 7 is known in a given position of the conduit 5, it is possible to derive the flow rate through geometric considerations or by means of a calibration measurement.

With regard to the detection of the presence of medium-sized particles or air bubbles, i.e. with diameters greater than 10 µm, it is possible to analyse over time the signal detected by the first photodiode 9 and, if present, by the second photodiode 13.

In the first photodiode 9 the direct signal of the particle shadow will be present, together with the self-mix signal induced by its retro-reflection.

A simple threshold algorithm is therefore able to indicate the presence of particles.

In the second photodiode 13 only the self-mix signal will be present, which can be used together with that of the first photodiode 9 to increase the reliability of the measurement.

As regards small particles, that is with a diameter less than 10 µm, it is possible to estimate their presence and properties through a direct measurement of the light diffused in the third photodiode 15, together with the information of their presence indicated over time by the same self-mix signal.

In conclusion, in addition to the speed measurement, with sensor-fusion techniques applied to the available photodiodes, it is possible to optimise the sensitivity and accuracy of the system in measuring the presence, quantity and size statistics of the suspended particles or bubbles.

In practice it has been found that the method and the apparatus for measuring the properties of a liquid, according to the present invention, fulfil the intended aim and objects, since they allow the properties of interest of the liquid to be obtained in real-time and in a non-invasive manner.

Another advantage of the apparatus and of the method, according to the invention, lies in the fact that it is possible to obtain information relating to the presence of particles in the liquid in order to detect the presence of unwanted substances or impurities.

Another advantage still lies in being able to count the average number of suspended particles in the liquid and their average sizes.

A still further advantage lies in being able to detect the presence of air bubbles and measure their average number and size.

Still another advantage lies in allowing the recognition of the solid components dissolved in the liquid, due to the different scattering frequencies, and being able to perform chemical analyses of the liquid components in real time.

A further advantage of the apparatus, according to the invention, is that it has no moving parts and is therefore highly reliable.

Another advantage of the apparatus is that it does not have parts in direct contact with the liquid to be analysed.

Another advantage still lies in the fact that the measurement method, according to the invention, is not influenced by the geometry of the conduit or by the temperature of the liquid.

Another advantage of the apparatus and of the method, according to the invention, is that the simultaneous use of several photodiodes makes it possible to discern the type of optical discontinuity detected: the photodiode placed orthogonally to the laser beam measures the light diffused from the suspended particles in the liquid, the monitor photodiode only measures the self-mixing effect, i.e. the disturbance on the laser, the external photodiode contains both the self-mixing information and the information indicating the presence of suspended air bubbles or large particles. The combination of these signals can be interpreted by a microprocessor to provide very reliable information on the properties of the liquid, thanks to the strong redundancy of the overall system.

Yet a further advantage lies in being able to measure the Brix degrees of a solution in real time.

Another advantage of the apparatus, according to the invention, lies in the fact that it can be used transversely in different technical sectors, since the presence of a plurality of sensors arranged variously with respect to the conduit within which the liquid of interest flows, allows detecting a multiplicity of different properties of the liquid itself, having a single experimental set-up.

Another advantage of the apparatus and of the method according to the invention is that it can be used to identify contaminants inside water, constituted for example by micelles, or to distinguish similar liquids having different characteristics, being able for example to distinguish whole milk from soy milk or micro filtered milk.

The apparatus and method thus conceived are susceptible to many modifications and variants, all falling within the same inventive concept; furthermore, all details can be replaced by equivalent technical elements.

The invention claimed is:

1. A method for measuring the properties of a liquid comprising the steps of:
    generating a laser light beam from a semiconductor laser source comprising a laser cavity;
    directing said laser light beam towards a conduit transparent to said laser light beam through which a liquid flows, inside said transparent conduit the power of said laser light beam being modulated due to retro-reflection of said laser light beam towards said laser cavity operated by suspended particles moving inside said liquid according to an effect of self-mixing interferometry,
    detecting, through a first photodiode arranged downstream of said transparent conduit, the power of said laser light beam modulated due to said retro-reflection;
    detecting, through a second photodiode arranged upstream of said laser cavity, the power of said laser light beam modulated due to said retro-reflection;
    correlating said modulated power detected by said first photodiode with said modulated power detected by said second photodiode in order to improve the signal-to-noise ratio;
    processing said detected modulated power, through a processing and control unit, in order to obtain one or more of the following properties of said liquid:
    average flowing speed of said liquid in said conduit,
    flow rate of said liquid in said conduit;
    presence of said suspended particles in said liquid,
    average size of said suspended particles in said liquid,
    average number of said suspended particles in a volume of said liquid
    type of said suspended particles in said liquid.

2. The method for measuring the properties of a liquid according to claim 1, further comprising the steps of:
    detecting, through a third photodiode arranged substantially orthogonally relative to the direction of said laser light beam, the power of the radiation scattered from said suspended particles moving inside said liquid;
    processing said power of the scattered radiation through said processing and control unit, in order to obtain the statistical distribution of said suspended particles in said liquid and to provide verification or redundancy information relative to said obtained properties of said liquid.

3. The method for measuring the properties of a liquid according to claim 1, further comprising the steps of:
- detecting, by means of an additional photodiode arranged in series to said first photodiode, i.e. placed side by side with said first photodiode along a direction substantially parallel to the flowing direction of said liquid to the inside of said conduit, said power of said laser light beam modulated due to the presence of said liquid;
- correlating said modulated power detected by said first photodiode with said modulated power detected by said additional photodiode to estimate the refractive index of said liquid;
- obtaining the Brix degrees of said liquid.

4. The method for measuring the properties of a liquid according to claim 1, further comprising the steps of analysing over time said modulated power detected by said first photodiode to identify and count particles or bubbles having diameters greater than 10 μm inside said liquid.

5. The method for measuring the properties of a liquid according to claim 1, wherein said laser light beam generated by said semiconductor laser source exhibits a natural divergence.

6. The method for measuring the properties of a liquid according to claim 1, further comprising the step of collimating said laser light beam through a collimation lens.

7. The method for measuring the properties of a liquid according to claim 1, further comprising the steps of:
- detecting, by means of an additional photodiode arranged in series to said first photodiode, i.e. placed alongside said first photodiode along a direction substantially parallel to the flowing direction of said liquid inside said conduit, said power of said laser light beam modulated due to the presence of particles in said liquid;
- cross-correlating over time said modulated power detected by said first photodiode with said modulated power detected by said fourth additional photodiode to estimate the flowing speed of said liquid;
- obtaining the flow of said liquid in said conduit.

8. An apparatus for measuring the properties of a liquid comprising:
- a semiconductor laser source comprising a laser cavity and adapted to generate a laser light beam directed towards a conduit transparent to said laser light beam through which a liquid flows, inside said transparent conduit the power of said laser light beam being modulated due to retro-reflection of said laser light beam towards said laser cavity operated by suspended particles moving inside said liquid, according to a self-mixing interferometry effect,
- a first photodiode arranged downstream of said transparent conduit, adapted to detect the power of said laser light beam modulated due to said retro-reflection;
- a second photodiode arranged upstream of said laser cavity, adapted to detect the power of said laser light beam modulated due to said retro-reflection
- a processing and control unit adapted to correlate said modulated power detected by said first photodiode with said modulated power detected by said second photodiode in order to improve the signal-to-noise ratio and to process said modulated power detected in order to obtain one or more of the following properties of said liquid:
  - average flowing speed of said liquid in said conduit,
  - flow rate of said liquid in said conduit;
  - presence of said suspended particles in said liquid,
  - average size of said suspended particles in said liquid,
  - average number of said suspended particles in a volume of said liquid
  - type of said suspended particles in said liquid.

9. The apparatus for measuring the properties of a liquid, according to claim 8, further comprising an additional photodiode arranged in series to said first photodiode, i.e. alongside said first photodiode along a direction substantially parallel to the flow direction of said liquid inside said conduit, adapted to detect said power of said laser light beam modulated due to the presence of said liquid, said processing and control unit being adapted to correlate said modulated power detected by said first photodiode with said modulated power detected by said additional photodiode for estimating the refractive index of said liquid and deriving the Brix degrees of said liquid.

10. The apparatus for measuring the properties of a liquid, according to claim 8, wherein said laser light beam generated by said semiconductor laser source exhibits a natural divergence.

11. The apparatus for measuring the properties of a liquid according to claim 8, further comprising a collimation lens of said laser light beam.

12. The apparatus for measuring the properties of a liquid, according to claim 8, further comprising an additional photodiode arranged in series to said first photodiode, i.e. alongside said first photodiode along a direction substantially parallel to the flow direction of said liquid inside said conduit, adapted to detect said power of said laser light beam modulated due to the presence of particles in said liquid, said processing and control unit being adapted to cross-correlate over time said modulated power detected by said first photodiode with said modulated power detected by said additional photodiode for estimating the flowing speed of said liquid and deriving the flow of said liquid in said conduit.

13. A method for measuring the properties of a liquid comprising the steps of:
- generating a laser light beam from a semiconductor laser source comprising a laser cavity;
- directing said laser light beam towards a conduit transparent to said laser light beam through which a liquid flows, inside said transparent conduit the power of said laser light beam being modulated due to retro-reflection of said laser light beam towards said laser cavity operated by suspended particles moving inside said liquid according to an effect of self-mixing interferometry,
- detecting, through a first photodiode arranged downstream of said transparent conduit, the power of said laser light beam modulated due to said retro-reflection;
- detecting, through an additional photodiode arranged substantially orthogonally relative to the direction of said laser light beam, the power of the radiation scattered from said suspended particles moving inside said liquid;
- processing said power of the scattered radiation through said processing and control unit, in order to obtain the statistical distribution of said suspended particles in said liquid and to provide verification or redundancy information relative to said obtained properties of said liquid;
- processing said detected modulated power, through a processing and control unit, in order to obtain one or more of the following properties of said liquid:
  - average flowing speed of said liquid in said conduit,
  - flow rate of said liquid in said conduit;
  - presence of said suspended particles in said liquid, average size of said suspended particles in said liquid, average number of said suspended particles in a volume of said liquid type of said suspended particles in said liquid.

14. An apparatus for measuring the properties of a liquid comprising:
- a semiconductor laser source comprising a laser cavity and adapted to generate a laser light beam directed towards a conduit transparent to said laser light beam through which a liquid flows, inside said transparent conduit the power of said laser light beam being modulated due to retro-reflection of said laser light beam towards said laser cavity operated by suspended particles moving inside said liquid, according to a self-mixing interferometry effect,
- a first photodiode arranged downstream of said transparent conduit, adapted to detect the power of said laser light beam modulated due to said retro-reflection;
- an additional photodiode arranged substantially orthogonally relative to the direction of said laser light beam adapted to detect the power of radiation scattered from said suspended particles moving inside said liquid,
- a processing and control unit adapted to process said power of the scattered radiation in order to obtain the statistical distribution of said suspended particles in said liquid and to provide verification or redundancy information with respect to said obtained properties of said liquid and to process said modulated power detected in order to obtain one or more of the following properties of said liquid:

average flowing speed of said liquid in said conduit, flow rate of said liquid in said conduit;

presence of said suspended particles in said liquid, average size of said suspended particles in said liquid, average number of said suspended particles in a volume of said liquid type of said suspended particles in said liquid.

* * * * *